US012737640B2

(12) United States Patent
Suh et al.

(10) Patent No.: US 12,737,640 B2
(45) Date of Patent: Sep. 15, 2026

(54) CONTROLLABLE DYNAMIC MULTI-TASK ARCHITECTURES

(71) Applicant: NEC Laboratories America, Inc., Princeton, NJ (US)

(72) Inventors: Yumin Suh, Santa Clara, CA (US); Samuel Schulter, New York, NY (US); Xiang Yu, Mountain View, CA (US); Masoud Faraki, San Francisco, CA (US); Manmohan Chandraker, Santa Clara, CA (US); Dripta Raychaudhuri, Riverside, CA (US)

(73) Assignee: NEC Corporation, Tokyo (JP)

( * ) Notice: Subject to any disclaimer, the term of this patent is extended or adjusted under 35 U.S.C. 154(b) by 1051 days.

(21) Appl. No.: 17/899,913

(22) Filed: Aug. 31, 2022

(65) Prior Publication Data

US 2023/0196122 A1 Jun. 22, 2023

Related U.S. Application Data

(60) Provisional application No. 63/279,717, filed on Nov. 16, 2021, provisional application No. 63/240,522, filed on Sep. 3, 2021.

(51) Int. Cl.
*G06N 3/0985* (2023.01)

(52) U.S. Cl.
CPC .................................. *G06N 3/0985* (2023.01)

(58) Field of Classification Search
CPC .................................................... G06N 3/0985
See application file for complete search history.

(56) References Cited

U.S. PATENT DOCUMENTS

2019/0130257 A1* 5/2019 Meyerson .............. G06N 3/048
2023/0076457 A1* 3/2023 Gao ......................... G06N 3/04

OTHER PUBLICATIONS

Bruggemann et al., "Automated Search for Resource-Efficient Branched Multi-Task Networks" (Year: 2020).*
Guo et al., "Learning to Branch for Multi-task Learning" (Year: 2020).*
Lin et al., "Controllable Pareto Multi-task Learning" (Year: 2021).*
Mahabadi et al., "Parameter-efficient Multi-task Fine-tuning for Transformers via Shared Hypernetworks" (Year: 2021).*
Sarafian et al., "Recomposing the Reinforcement Learning Building Blocks with Hypernetworks" (Year: 2021).*
Liu, H., Simonyan, K., & Yang, Y. (Jun. 24, 2018). Darts: Differentiable architecture search. arXiv preprint arXiv:1806.09055.

(Continued)

*Primary Examiner* — David Yi
*Assistant Examiner* — Andrew Bracero
(74) *Attorney, Agent, or Firm* — Vincent Duffy

(57) ABSTRACT

Systems and methods for generating a hypernetwork configured to be trained for a plurality of tasks; receiving a task preference vector identifying a hierarchical priority for the plurality of tasks, and a resource constraint as a tuple; finding tree sub-structures and the corresponding modulation of features for every tuple within an N-stream anchor network; optimizing a branching regularized loss function to train an edge hypernet; and training a weight hypernet, keeping the anchor net and the edge hypernet fixed.

20 Claims, 7 Drawing Sheets

(56) References Cited

OTHER PUBLICATIONS

Navon, A., Shamsian, A., Chechik, G., & Fetaya, E. (Oct. 8, 2020). Learning the pareto front with hypernetworks. arXiv preprint arXiv:2010.04104.

Lin, X., Yang, Z., Zhang, Q., & Kwong, S. (Oct. 13, 2020). Controllable pareto multi-task learning. arXiv preprint arXiv:2010.06313.

Wang, X., Yu, F., Dou, Z. Y., Darrell, T., & Gonzalez, J. E. (Sep. 8, 2018). Skipnet: Learning dynamic routing in convolutional networks. In Proceedings of the European Conference on Computer Vision (ECCV) (pp. 409-424).

Dosovitskiy, A., & Djolonga, J. (Sep. 25, 2019). You only train once: Loss-conditional training of deep networks. In International conference on learning representations.

Yuan, Z., Wu, B., Sun, G., Liang, Z., Zhao, S., & Bi, W. (Aug. 23, 2020). S2dnas: Transforming static cnn model for dynamic inference via neural architecture search. In European Conference on Computer Vision (pp. 175-192). Springer, Cham.

* cited by examiner

CONTROLLABLE DYNAMIC MULTI-TASK ARCHITECTURES

RELATED APPLICATION INFORMATION

This application claims priority to U.S. Provisional Application No. 63/240,522, filed on Sep. 3, 2021, and U.S. Provisional Application No. 63/279,717, filed on Nov. 16, 2021, both incorporated herein by reference in its entirety.

BACKGROUND

Technical Field

The present invention relates to Multi-task learning and more particularly to tree-structured dynamic multi-task network.

Description of the Related Art

Many real-world applications involve solving a multitude of visual tasks. For instance, robots need to recognize objects together with the 3D scene geometry to interact with the environment, while surveillance systems need to identify people and their poses to detect spurious actions. Multitask learning (MTL) attempts to solve multiple tasks simultaneously.

A unified or multi-task model may solve multiple tasks at the same time compared to single-task models. Multi-task models may provide a single solution that predicts diverse information such as attributes, identities, poses, without training and deploying separate models for individual tasks, but there may be trade-offs between task accuracies for the different tasks. The tasks can also compete against each other for a limited computational budget (memory and inference time) because of task-specific features. There can also be a trade-off between accuracy and total computational cost. Competing tasks can lead to a Pareto Front of solutions.

SUMMARY

According to an aspect of the present invention, a method is provided for building a dynamic multi-task network. The method includes generating a hypernetwork configured to be trained for a plurality of tasks, and receiving a task preference vector identifying a hierarchical priority for the plurality of tasks, and a resource constraint as a tuple. The method further includes finding tree sub-structures and the corresponding modulation of features for every tuple within an N-stream anchor network, optimizing a branching regularized loss function to train an edge hypernet, and training a weight hypernet, keeping the anchor network and the edge hypernet fixed.

According to another aspect of the present invention, a system is provided for building a dynamic multi-task network. The system includes one or more processors, a memory in communication with the one or more processors, and a dynamic multi-task network builder stored in the memory, wherein the dynamic multi-task network builder performs: generating a hypernetwork configured to be trained for a plurality of tasks; receiving a task preference vector identifying a hierarchical priority for the plurality of tasks, and a resource constraint as a tuple; finding tree sub-structures and the corresponding modulation of features for every tuple within an N-stream anchor network; optimizing a branching regularized loss function to train an edge hypernet; and training a weight hypernet, keeping the anchor net and the edge hypernet fixed.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
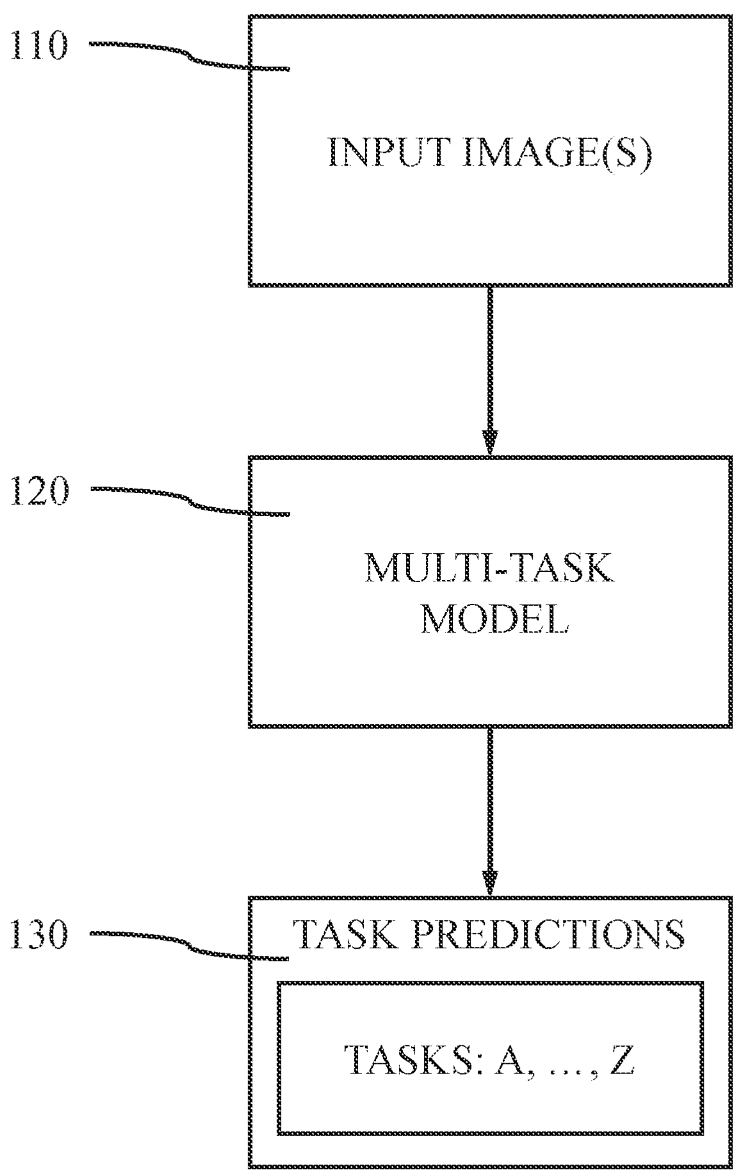
FIG. 1 is a block/flow diagram illustrating a high-level system/method for multi-task predictions is illustratively depicted in accordance with an embodiment of the present invention, in accordance with an embodiment of the present invention.

In accordance with embodiments of the present invention, systems and methods are provided for a multi-task model based on the deep neural network, where users can dynamically control the task accuracy trade-off and the total computational cost. This can save on unnecessary computational burden by scarifying the accuracy of tasks that are not of interest, while focusing on the tasks of interest by specifying the target preference as an input.

Conventional multi-task models assume that the desired task importance or preferences are known in advance, so that each model is trained to satisfy the target preference. As a result, each model corresponds to one task preference and this may not be changed once training is completed. Similarly, the total computational cost may be fixed in advance and cannot be changed once training is done.

In one or more embodiments, a multi-task model based on the deep neural network can transform input to output predictions defined by two factors, architecture and weights. The architecture defines the flow of the data in the model, starting from an input image to the output predictions. The actual behavior of each module is defined by weights.

In one or more embodiments, a single multi-task model allows users to dynamically choose the desired task preference and computational cost. The target computational cost can be an input in addition to the task preference vector.

In one or more embodiments, the architecture defines the flow of the data in the model, starting from an input image to the output predictions. The architecture is represented as a sequence of modules in the model that will be applied to the input. Note that architecture can determine the order of modules to be performed, whereas the actual behavior of each module is determined by weights. Weights are defined in the form of tensors, so that tensor multiplication operations are specified. As a result, different architectures lead to difference computational costs. In contrast, varying only weights under a fixed architecture will not change the total computational cost.

For example, for a surveillance system installed at a sports stadium, before a game starts, personal identification is the most important task to identify the people entering the gate. During the game, however, pose estimation for abnormal action detection can become more important. A single solution can address the varying importance of tasks over time.

In addition, a single solution can be deployed to several different customers that need different subsets of tasks. Let us consider two customers, A and B, where customer A needs a solution for two tasks, pose estimation and person re-identification, but does not need attribute recognition, whereas customer B needs a solution for two tasks, attribute recognition and person re-identification, but does not need pose estimation. It is intractable to employ N different models, because this requires N times training time, memory, and inference time for N different preference vectors. A single model trained, for example, for three tasks can provide an efficient solution for these different task combinations by properly setting input preference vectors.

Simultaneously optimizing all tasks is difficult because of task conflicts and limited model capacity. Consequently, a trade-off between the competing tasks has to be found, necessitating precise balancing of the different task losses during optimization.

In one or more embodiments, a main model (M) can be trained together with an extra network (H) that takes a preference vector as input and outputs the architecture of the main model. This can take the target computational cost as an input in addition to the task preference vector, and allow changes to the architecture instead of only changes to weights. Users can control the total computational cost in addition to the task preference, and an enlarged search space for the model can lead to better performance.

In many applications, the desired trade-off can change over time, requiring a new model to be retrained from scratch. Multi-task learning seeks to learn a single model to simultaneously solve a variety of learning tasks by sharing information among the tasks.

A hypernetwork can be used to learn context dependent parameters for a dynamic network, thus, obtaining a plurality of customizable models utilizing a single neural network. The hypernetworks can be used to model the tradeoffs in multi-task learning by varying the architecture. This can allow dynamic resource allocation.

Dynamic neural networks, as opposed to usual static models, can adapt their structures during inference, leading to notable improvements in performance and computational efficiency. Dynamic depth is realized by either early exiting, that is, allowing "easy" samples to be processed at shallow layers without executing the deeper layers or layer skipping, i.e., selectively skipping intermediate network layers conditioned on each sample.

Dynamic width is an alternative to the dynamic depth where instead of layers, filters are selectively pruned conditioned on the input.

Dynamic routing can be implemented by learning (training) controllers to selectively execute one of multiple candidate modules at each layer.

The routing modules utilize a differentiable activation function which conditionally outputs zero values, facilitating the end-to-end training of routing decisions.

In various embodiments, the method enables explicit control of the total computational cost as well as the task trade-offs.

Weight sharing has evolved as a powerful tool to amortize computational cost across models for neural architecture search (NAS). These methods integrate the whole search space of architectures into a weight sharing supernet and optimize network architectures by pursuing the best performing sub-networks. Joint optimization methods optimize the weights of the supernet and a differentiable routing policy simultaneously.

Referring now in detail to the figures in which like numerals represent the same or similar elements and initially to FIG. 1, a high-level system/method for multi-task predictions is illustratively depicted in accordance with one embodiment of the present invention.

In various embodiments, the multi-task model 120 is a deep neural network, that takes an image as an input 110 and outputs task predictions 130 for multiple different tasks, A to Z. In various embodiments, the tasks can be, for example, edge detection, semantic segmentation, human parts segmentation, surface normals estimation, saliency, and pose estimation.

In various embodiments, a single model can be used for three or more tasks, where weights can be determined for each of the different tasks.

Figure 2:
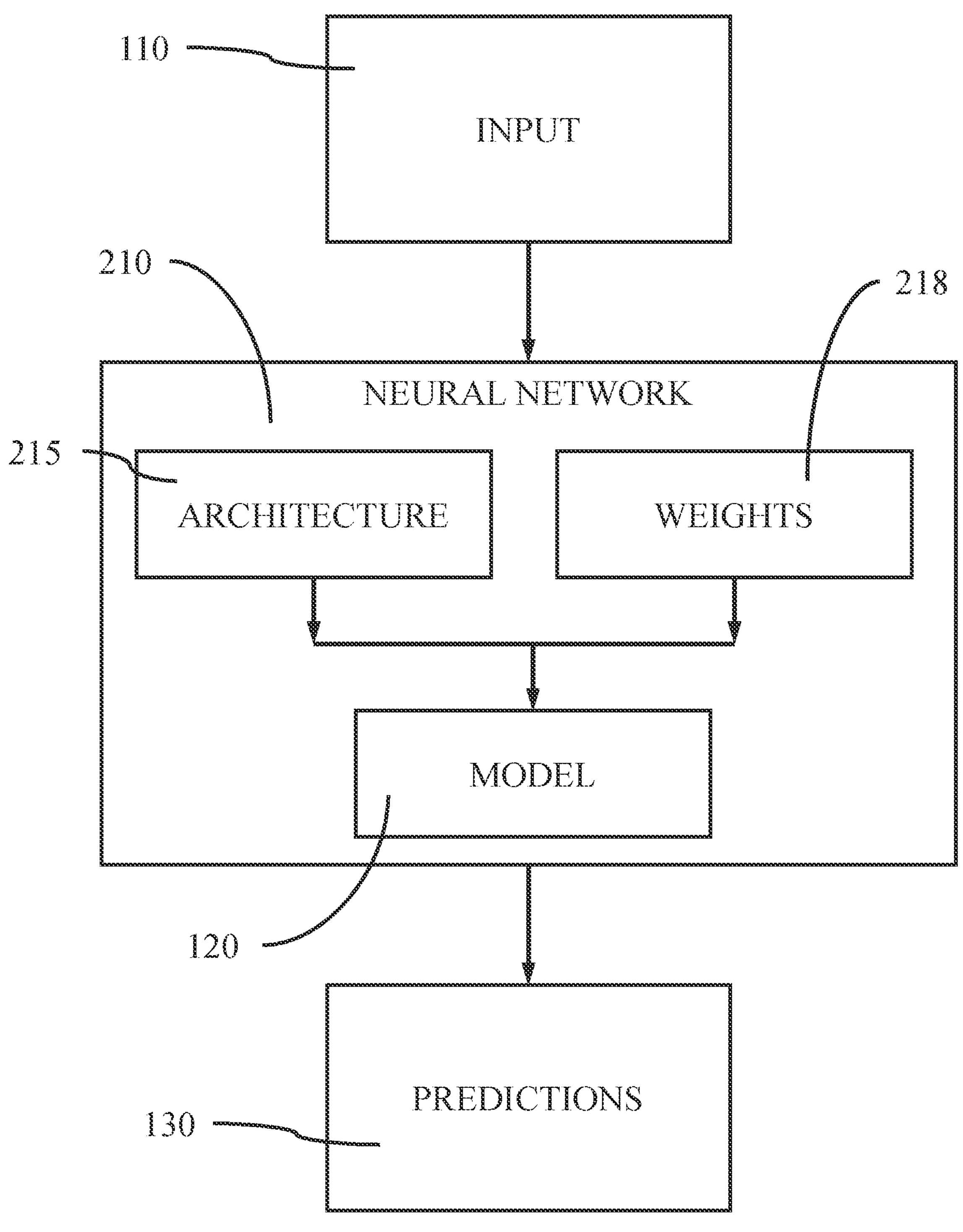
FIG. 2 is a block/flow diagram illustrating a system/method for multi-task predictions is illustratively depicted in accordance with an embodiment of the present invention, in accordance with an embodiment of the present invention.

Referring now to FIG. 2, a system/method for multi-task predictions is illustratively depicted in accordance with an embodiment of the present invention.

In one or more embodiments, the neural network 210 can be described by an architecture 215 and the applied weights 218 that determine the model 120 being applied.

The model 120 behavior that transforms input to output predictions can be defined by two factors, the model architecture 215 and the assigned/learned weights 218. The model architecture 215 defines the flow of the data in the model 120, from input to the output predictions 130. The model 120 is represented as a sequence of modules in the model that will be applied to the input 110. Note that architecture defines the order of modules used to perform the tasks, whereas the actual behavior of each module is defined by assigned/learned weights 218, which can be represented as tensors. As a result, different architectures 215 lead to different computational costs, whereas the computational cost does not change over different weights.

Figure 3:
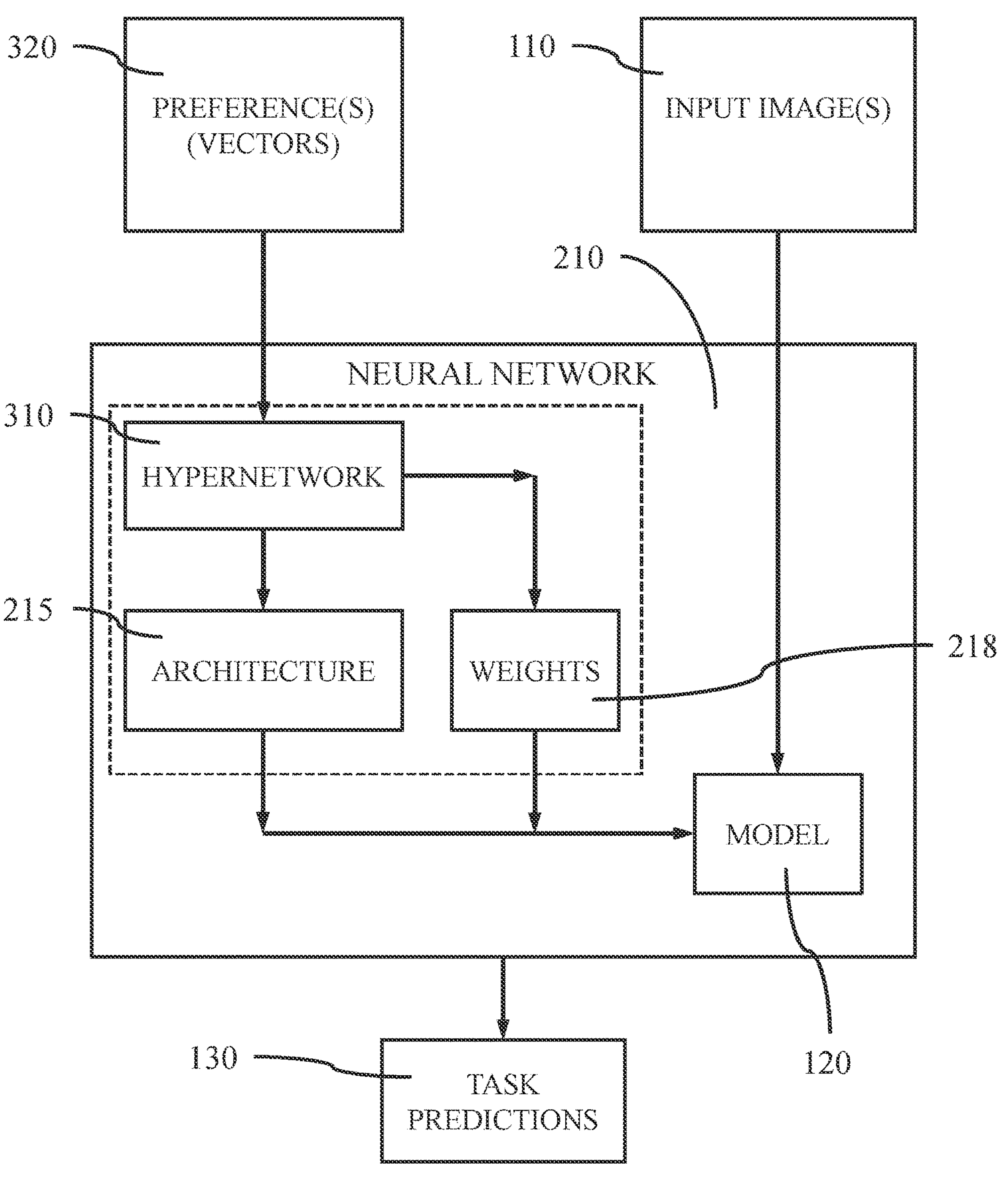
FIG. 3 is a block/flow diagram illustrating a system/method for building the model(s) for multi-task predictions, in accordance with an embodiment of the present invention.

FIG. 3 is a flow diagram illustrating a system/method for building the model(s) for multi-task predictions, in accordance with an embodiment of the present invention.

In various approaches, one model 120 corresponds to one preference vector 320, where larger values of $r_i$ denote higher importance to task $T_i$. Given a preference vector 320 identifying a hierarchical priority for the plurality of tasks and the pre-determined architecture 215, the model is trained to find the weights 218 that result in the best task predictions 130 performance for the defined task. In various embodiments, the desired importance of tasks can be represented as a preference vector 320.

In contrast to conventional methods, this approach dynamically changes the architecture 215 as a function of a preference vector 320 at an inference time. As a result, a single model 120 corresponds to a range of preference vectors 320. To implement this property, a hyper-network 310 can be introduced that takes the preference vector 320 as an input and outputs an architecture 215. The architecture 215 predicted from the hyper-network is then used together with learned weights 218 to define the behavior for the main model 120. In this way, users can control the task-preference of the model 120 by adjusting the preference vector 320, as additional input.

A hypernetwork 310 can be used to learn context dependent parameters for a dynamic network to obtain multiple customizable models 120 using a single network 210. The hypernetwork 310 can model a Pareto front of competing multi-task objectives. The trade-off curve defined by different values of r using tree-structured sub-networks within a single multi-task model can be approximated given a total computational budget defined by a resource preference variable $c \in [0,1]$, where larger c denotes more frugal resource usage. The hypernetwork 310 can be used to model the tradeoffs in multi-task learning by varying the architecture 215 based on preferences 320. This can allow dynamic resource allocation.

This is formulated as a minimization of the expected value of the task loss over the user preference distribution, with added regularization to control resource usage, $\mathbb{E}_{(r,c)\sim P_{(r,c)}} L_{task}(r)+\Omega(r,c)$.

Optimizing this directly is equivalent to solving NAS for every possible (r, c) simultaneously. Thus, instead of solving directly, we cast it as a search to find tree sub-structures and the corresponding modulation of features for every (r, c), within an N-stream anchor network with fixed weights.

In various embodiments, the hypernetwork 310 can be trained to map a tuple of task preferences, r, and a resource constraint, c, as (r, c), to a particular architectural configuration 215.

$$(r, c) \rightarrow h(\cdot,\ \phi) \xrightarrow{\alpha_{(r,c)}} f(\cdot, \theta, \alpha_{(r,c)}) \rightarrow \ell_1, \ldots, \ell_m;$$

where $\ell_1, \ldots, \ell_m$ are the calculated losses for tasks 1 to m (m is the number of tasks), (r, c) is the tuple inputted into the function, $h(\cdot, \phi)$, r is the weight applied to each task, c is the resource constraint parameter value, and $\alpha_{(r,c)}$ is the architectural configuration. x is the parameter for balancing of the different task losses during optimization.

Dynamic neural networks, as opposed to static models, can adapt their structures during inference, leading to notable improvements in performance.

Figure 4:
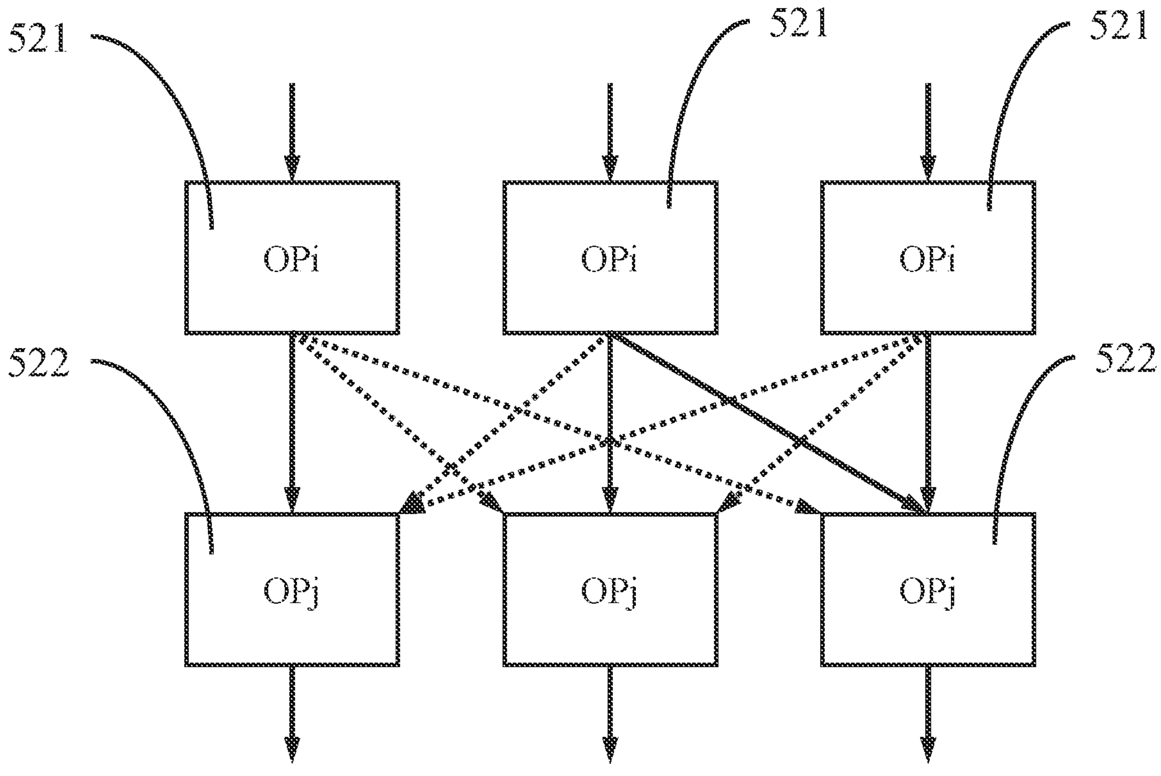
FIG. 4 is a block/flow diagram illustrating a system/method for an Architectural Search Space for a block containing N parent and child nodes, in accordance with an embodiment of the present invention.

FIG. 4 is a block/flow diagram illustrating a system/method for an Architectural Search Space for a block containing N parent and child nodes, in accordance with an embodiment of the present invention.

In one or more embodiments, a hypernetwork 310 predicts the parent distribution parameters at each layer, $\alpha=[\alpha_1, \alpha_2, \ldots, \alpha_L]$. Nodes in layer l are sampled in accordance with a categorical distribution defined by:

$$\alpha_j^l\left(\sum_i \alpha_j^l(i) = 1\right),$$

for each node (l+1,j) in layer l+1. The search space is represented as a directed acyclic graph (DAG) containing N parent and child nodes, where vertices in the graph represent different operations and edges denote the data flow through the network. We realize a tree-structure by stacking such blocks sequentially and allowing a child node to sample a path from the candidate paths between itself and all its parent nodes.

In various embodiments, blocks can be stacked to get a tree-structured multi-task network, where the blocks represent models for a single task.

Different solutions correspond to different task preferences. Some preference vectors may not require full model capacity. Model structure is affected by task preferences. This can provide for dynamic resource allocation for preferred tasks.

Increasing the resource constraint, c, (less resources) leads to branching at later layers. The model can be trained to dynamically allocate resources over tasks based on preference.

The network can be trained to predict a configuration of a main model.

In various embodiments, a hypernetwork which maps a tuple of task preferences and resource constraint (r, c) to architectural configuration, $\alpha_{(r,c)}$.

Figure 5:
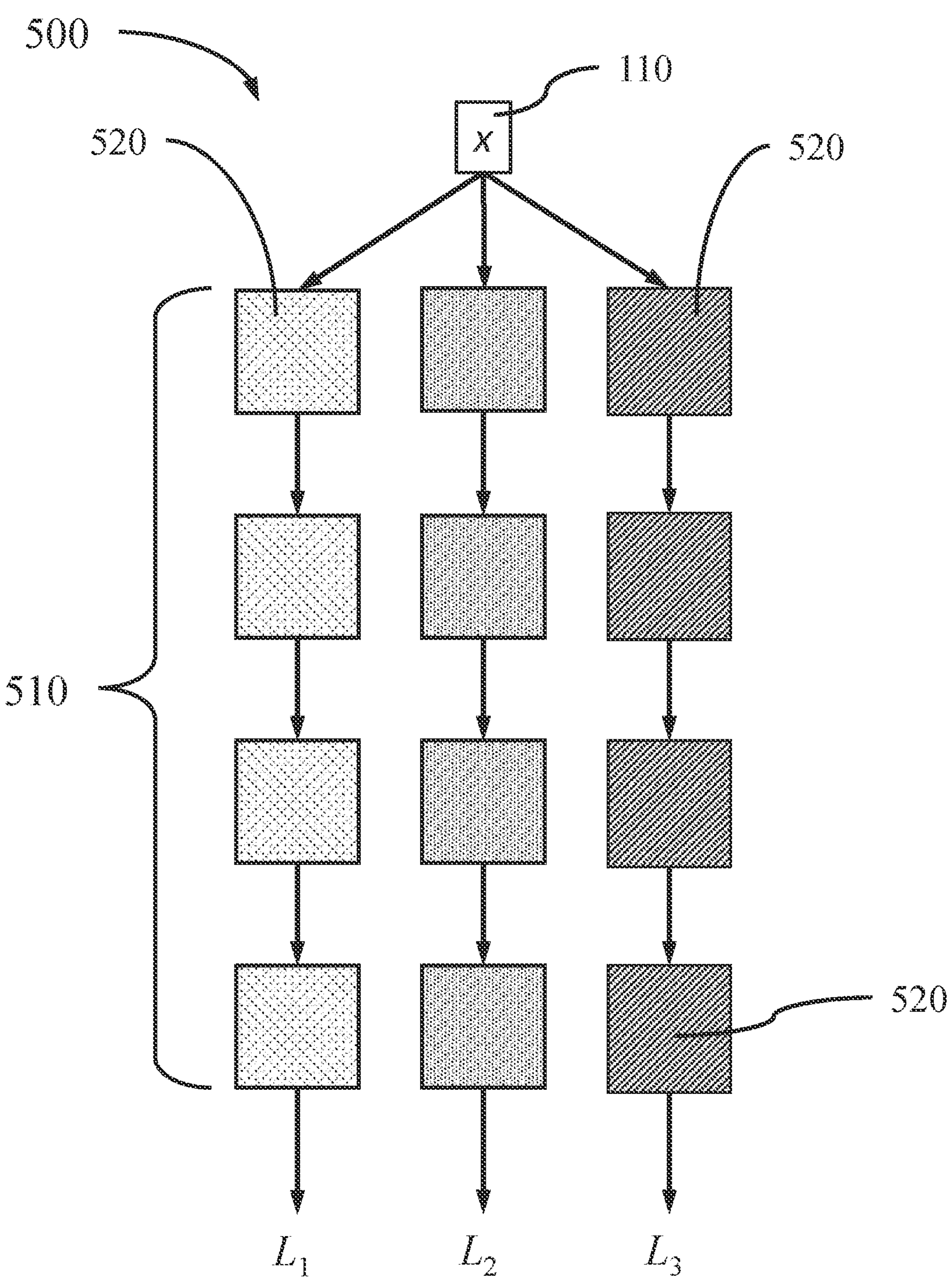
FIG. 5 is a block/flow diagram illustrating a system/method for Anchor Network Training, in accordance with an embodiment of the present invention.

FIG. 5 is a block/flow diagram illustrating a system/method for Anchor Network Training, in accordance with an embodiment of the present invention.

The anchor net, including N-stream backbones trained for N individual tasks can provide the weights in the tree structures predicted by the edge hypernet. These base weights are further modulated via the weight hypernet to address the cross-task connections unseen in the anchor net. Such adaptation using modulation of the normalization parameters has been successfully applied. The branching in tree-structured MTL networks can be contingent on how similar task features are at any layer. The anchor net provides the prior of which features are easily sharable between tasks. It can also be interpreted as a supernet used in one-shot NAS approaches, which is capable of emulating any architecture in the search space.

In one or more embodiments, a tree-structured network topology can be utilized, which shares common low-level features over tasks while extracting task-specific ones in the higher layers, enabling control of the trade-off between tasks by changing branching locations conditioned on the desired preference (r, c).

In one or more embodiments, the framework can be initialized using an anchor network 500 which includes single-task networks 510. During training, the edge hypernetwork can be trained using sampled preferences, r, to optimize the task loss, $l_m$, and a branching regularizer, for preference aware branching.

The search space can be represented as a directed acyclic graph (DAG), where vertices in the graph represent numerical operations (convolution, pooling etc.) and edges denote the data flow through the network. A block of such a graph can contain N parent nodes 521 at layer l, and child nodes 522 at layer l+1. A tree-structure can be formed by stacking such blocks sequentially and allowing a child node to sample a path from the candidate paths between itself and all its parent nodes. Concretely, we formulate the stochastic branching operation at layer/as:

$$x_j^{l+1} = d_j \cdot Y^l, d_j \sim P_{\alpha_j^l};$$

where $$x_j^{l+1}$$

denotes the input to the j-th node in layer l+1, $d_j$ is a one-hot vector indicating the parent node sampled from the categorical branching distribution parameterized by $$\alpha_j^l \text{ and, } Y^1 = [y_1^l, \ldots, y_N^l]$$

concatenates outputs from all parent nodes at layer l. Note that selecting a parent from every node determines a unique tree structure. This dependence suggests learning $$\alpha = \{\alpha_j^l\}_{j \le N, l < L},$$

conditioned on a preference (r, c), in a manner which satisfies the desired task trade-offs.

In various embodiments, two hypernets can be used to construct a controller for dynamic architectural changes. The edge hypernet h, parameterized by $\phi$, predicts the branching parameters $\hat{\alpha}=h(r,c,\phi)$ within the anchor net. On the other hand, the weight hypernet $\bar{h}$, parameterized by $\bar{\phi}$, predicts the normalization parameters $\hat{\beta},\hat{\gamma}=\bar{h}(r,c,\phi)$ to adapt the predicted network.

Optimizing the task loss, $L_{task}$, takes into account the individual task performances without considering computational cost. Consequently, we introduce a branching regularizer, $\Omega(r,c,\hat{\alpha})$, to encourage node sharing (or branching) based on the preference. This regularizer contains two terms, the active loss, which encourages limited sharing of features among the high preference tasks, and the inactive loss, which aims to reduce resource utilization for the less important ones.

In particular, the active loss is additionally weighted by the cost preference, c, to enable the control of total computational cost. This can find the controller ($\phi$ and $\bar{\phi}$) that minimizes the expectation of the branching regularized task loss over the distribution of user preferences $P_{(r,c)}$:

$$\min_{\phi,\bar{\phi}} \mathbb{E}_{(r,c)\sim P_{(r,c)}} \mathcal{L}_{task}(r, \hat{\alpha}, \hat{\beta}, \gamma) + \Omega(r, c, \hat{\alpha}).$$

We disentangle the training of the hypernetworks for stability—the edge hypernet is trained first, followed by the weight hypernet. At test time, when a preference (r, c) is presented to the controller, the maximum likelihood architecture corresponding to the supplied preference is first sampled from the branching distribution parameterized by the predictions of h. The weights of this tree-structure are then inherited from the anchor net, supplemented via adapted normalization parameters predicted by $\bar{h}$.

In various embodiments, the weight hypernetwork can be optimized in a similar fashion by minimizing only the task loss. At inference, the hypernetworks jointly predict architecture, $\alpha_{(r,c)}$, and weights according to the user preferences.

In various embodiments, a search can be conducted to find tree sub-structures and the corresponding modulation of features for every (r, c), within an N-stream anchor network with fixed weights, where N is the number of tasks to be performed. The framework can include two hypernets, h and h, and an anchor net, F.

At test-time, given an input preference, the network connections can be utilized and adapted weights predicted by the hypernets to modulate F to obtain the final model.

In various embodiments, a two-stage training scheme can be utilized to train the framework.

Figure 6:
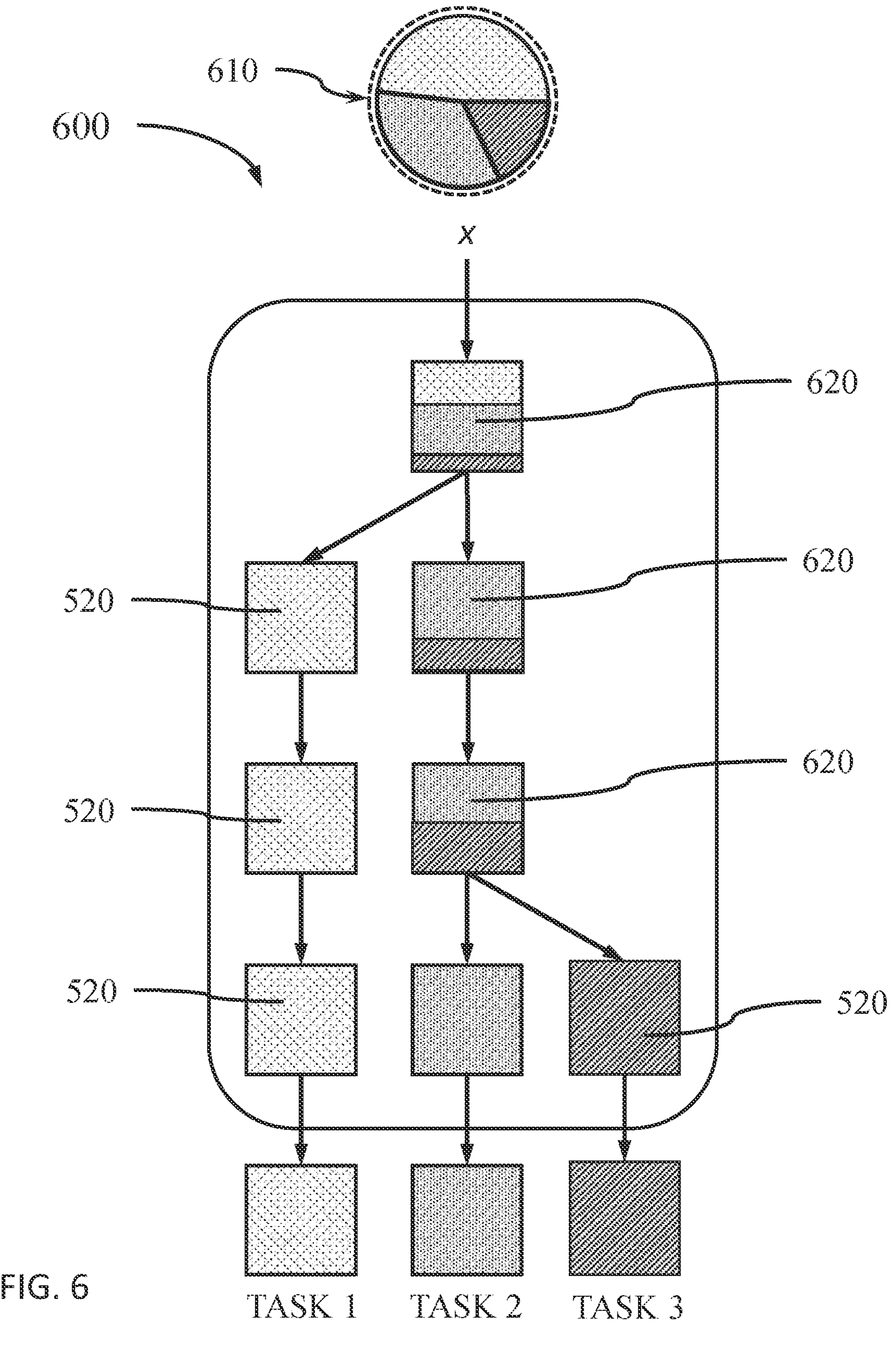
FIG. 6 is a block/flow diagram illustrating a system/method for an Architectural Search Space, in accordance with an embodiment of the present invention.

FIG. 6 is a block/flow diagram illustrating a system/method for an Architectural Search Space, in accordance with an embodiment of the present invention.

In one or more embodiments, an initial desired task preference and allocated computational cost 610 can be specified by a user, where the dashed circle represents the maximum allowed computational budget/cost, and the divided solid circle represents the actual allocated computational cost for a set, for example, of three tasks.

In one or more embodiments, the n-stream anchor network 500 for N separate tasks, which initially includes a plurality of single-task networks 510, can be refined by extracting task-specific features, and changing branching locations conditioned on a desired preference for an Architectural Search Space method 600. During training, the edge hypernetwork can be trained using sampled preferences, r, to optimize the task loss, $\ell_m$, and a branching regularizer, for preference aware branching. Branching regularization, based on active and inactive losses, encourages limited sharing between high importance tasks, while limiting branching for less preferred tasks. Shared nodes (modules) 620 represent model training shared across multiple tasks, whereas solid nodes (modules) 520 represent model training for specialized nodes (modules) for preferred tasks. The node shading represents the proportion of weights of the module allocated to each task. After branching a single task is eliminated from the subsequent nodes with shared tasks. Fewer modules result in lower resource costs.

Tasks with higher preferences can have a greater influence on the branching structure while tasks with smaller preferences may be de-emphasized by encouraging them to follow existing branching choices. Specifically, we define two losses, active and inactive losses, based on the task division into two groups, active tasks:

$$\mathcal{A} = \{\mathcal{T}_i \mid r_i \ge \tau, \forall\, i \in [N]\};$$

and inactive tasks, $$\mathcal{J} = \{\mathcal{T}_i \mid r_i < \tau, \forall\, i \in [N]\};$$

with some threshold, $\tau<1/N$.

Although individual tasks are already weighted by r in task loss, $L_{task}$, this explicit emphasizing of certain tasks over others was found to induce better controllability.

The active loss encourages limited sharing between high importance tasks, while the inactive loss tries to limit branching for less preferred tasks as much as possible.

The active loss $L_{active}$ encourages nodes in the anchor net, corresponding to the active tasks, to be shared in order to avoid the whole network being split up by tasks with little knowledge shared among them. Specifically, the weighted sum of pairwise $L_2$ distances between the sampled parent edges of the nodes pertaining to the active tasks are minimized. Formally, we define $L_{active}$ as:

$$\mathcal{L}_{active} = \sum_{l=1}^{L} \sum_{\substack{i,j \in \mathcal{A} \\ i \neq j}} \frac{L-1}{L} \cdot A(i, j) \cdot P(l, i, j) \cdot \left\| v_i^l - v_j^l \right\|^2,$$

where P(l, i, j)=$P_{use}$(l, i)·$P_{use}$(l, j) is the probability that the nodes i and j in layer l are used in the sampled tree structure and A (i, j) captures the task affinity between tasks $\tau_i$ and $\tau_j$. The factor, L−1/L encourages more sharing of nodes which contain low-level features.

We use the Gumbel-Softmax reparameterization trick to obtain the samples $$v_i^l$$

from the predicted logits $\hat{\alpha}$.

$$v_i^l(k) = \frac{\exp\left(\left(\log \alpha_i^l(k) + G_i^l(k)\right)/\tau\right)}{\sum_{m=1}^{N} \exp\left(\left(\log \alpha_i^l(m) + G_i^l(m)\right)/\tau\right)}.$$

Here, G\=bution with U\ sampled from a uniform i.i.d. distribution Unif(0, 1).

The inactive tasks should have minimal effect in terms of branching. Inactive loss, inactive* encourages these tasks to mimic the most closely related branching pattern:

$$\mathcal{L}_{inactive} = \sum_{l} \sum_{j \in \mathcal{I}} \min_{i \in \mathcal{A}} \left\| v_i^l - v_j^l \right\|^2.$$

This ensures that the network branching is controlled by the active tasks, with the inactive tasks sharing nodes with the active tasks. Thus, the branching regularizer is defined as follows:

$$\Omega(r, c, \hat{\alpha}) = c \cdot \lambda_{\mathcal{A}} \mathcal{L}_{active} + \lambda_{\mathcal{I}} \mathcal{L}_{inactive},$$

where $\lambda_A$ and $\lambda_J$ are hyperparameters to determine the weighting of the losses. Typically, we set $\lambda_A$=0.05 and $\lambda_J$=0.1. Here, the active loss is additionally weighted by the resource preference, c, so that larger c encourages more feature sharing to reduce total computational cost.

The architecture sampled by the edge hypernet h contains edges that have not been observed during the anchor net training. These are denoted as cross-task edges since they connect nodes that belong to different streams in F. Consequently, the performance of the sampled network is suboptimal. To rectify this issue, we propose to modulate the weights of the anchor net to adaptively update the unseen edges using an additional weight hypernet h. We modulate the normalization parameters using a hypernetwork. Concretely, we modulate the original batch normalization operation:

$$BN_i^l(x_i^l) = \gamma_i^l \frac{x_i^l - \mu_i^l}{\sigma_i^l} + \beta_i^l, \text{ to } BN_i^l(x_i^l) = (\gamma_i^l + \Delta\gamma_i^l) \frac{x_i^l - \mu_i^l}{\sigma_i^l} + (\beta_i^l + \Delta\beta_i^l),$$

by predicting the perturbations to the parameters:

$$\{\Delta\beta_i^l, \Delta\gamma_i^l\}_{i \leq N, l \leq L} = \overline{h}(r, c, \theta);$$

where $$\gamma_i^l$$

and $$\beta_i^l$$

are the original affine parameters, and $$\mu_i^l$$

and $$\sigma_i^l$$

denote the batch statistics of the node input $$x_i^l.$$

This modulation mostly affects the preferences with two or more tasks dominant, where cross-task connections occur.

Figure 7:
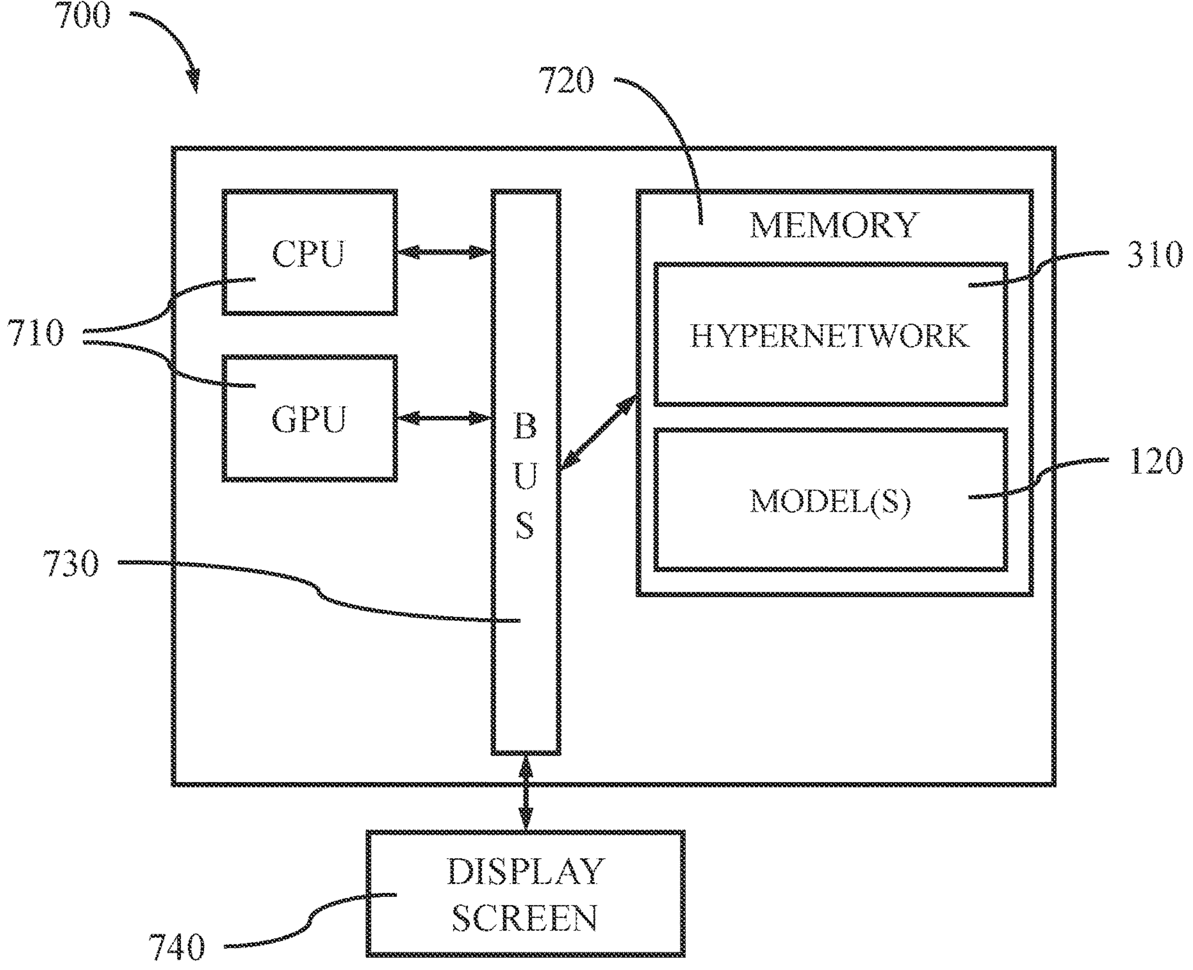
FIG. 7 is a block/flow diagram illustrating a computer system for multi-task predictions, in accordance with an embodiment of the present invention, in accordance with an embodiment of the present invention.

FIG. 7 is a block/flow diagram illustrating a computer system for multi-task predictions, in accordance with an embodiment of the present invention, in accordance with an embodiment of the present invention.

In one or more embodiments, a computer system 700 for building the model(s) 120 for multi-task predictions can include one or more processors 710, for example, central processing units (CPUs), graphics processing units (GPUs), and combinations thereof, electrically coupled to a memory 720, for example, hard disk drives (HDDs), solid state drives (SSDs), random access memory (RAM), and combinations thereof, through a bus 730. In various embodiments, the computer system 700 can be configured to build the model(s) 120 for multi-task predictions from input data and a task preference vector. The output of the system 700 can be presented to a user on a display screen 740 electrically coupled to the system bus 730. The computer system 700 can be configured to be trained and perform the features described in the application and FIGS. 1-6.

In one or more embodiments, the system 700 can include aa hypernetwork 310 for generating the models 120 stored in the memory 720.

In one or more embodiments, the computer system 700 can include the model(s) 120 stored in the memory 720, where the model(s) 120 are trained and configured to perform multiple different tasks involving predict features of the input data.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for building a dynamic multi-task network, comprising:

generating a hypernetwork configured to model tradeoffs among a plurality of competing tasks;

receiving a task preference vector identifying a hierarchical priority for the plurality of competing tasks, and a resource constraint as a tuple;

finding tree sub-structures and the corresponding modulation of features for every tuple within an N-stream anchor network;

optimizing a branching regularized loss function to train an edge hypernet, wherein the branching regularized loss function is based on an active loss $L_{active}$ and an inactive loss, the active loss, $L_{active}$, is calculated as:

$$\mathcal{L}_{active} = \sum_{l=1}^{L} \sum_{\substack{i, j \in \mathcal{A} \\ i \neq j}} \frac{L-l}{L} \cdot A(i, j) \cdot P(l, i, j) \cdot \left\| v_i^l - v_j^l \right\|^2$$

where P(l, i, j)=$P_{use}$(l, i)>$P_{use}$(l, j) is the probability that the nodes i and j in layer l are used in the sampled tree structure, and A(i, j) captures the task affinity between tasks, $\tau_i$ and $\tau_j$, and $$v_i^l$$

and $$v_j^l$$

are samples, $\mathcal{A}$ represents active tasks and L represents the total number of layers;

training a weight hypernet, keeping the anchor network and the edge hypernet fixed; and generating, by the hypernetwork before inference time, an architectural configuration for a main model based on the task preference vector and the resource constraint.

2. The method as recited in claim 1, wherein the N-stream anchor network has fixed weights for finding the tree sub-structures.

3. The method as recited in claim 1, wherein finding the tree sub-structures includes selecting a parent from every node.

4. The method as recited in claim 1, wherein the edge hypernet predicts the branching parameters within the anchor network.

5. The method as recited in claim 1, further comprising optimizing a task loss, $L_{task}$, by taking into account the individual competing task performances without considering a computational cost.

6. The method as recited in claim 1, wherein competing tasks with higher preferences have a greater influence.

7. The method as recited in claim 1, wherein the active loss is additionally weighted by a cost preference, c, of the resource constraint tuple to enable the control of total computational cost.

8. A computer system for building a dynamic multi-task network, comprising:

one or more processors;

a memory in communication with the one or more processors; and a dynamic multi-task network builder stored in the memory, wherein the dynamic multi-task network builder performs;

generate a hypernetwork configured to model tradeoffs among a plurality of competing tasks;

receive a task preference vector identifying a hierarchical priority for the plurality of competing tasks, and a resource constraint as a tuple;

find tree sub-structures and the corresponding modulation of features for every tuple within an N-stream anchor network;

optimize a branching regularized loss function to train an edge hypernet, wherein the branching regularized loss function is based on an active loss $L_{active}$ and an inactive loss, the active loss, $L_{active}$, is calculated as:

$$\mathcal{L}_{active} = \sum_{l=1}^{L} \sum_{\substack{i, j \in \mathcal{A} \\ i \neq j}} \frac{L-l}{L} \cdot A(i, j) \cdot P(l, i, j) \cdot \left\| v_i^l - v_j^l \right\|^2$$

where P(l, i, j)=$P_{use}$(l, i)·$P_{use}$(l, j) is the probability that the nodes i and j in layer l are used in the sampled tree structure, and A(i, j) captures the task affinity between tasks, $\tau_i$ and $\tau_j$, and $$v_i^l$$

and $$v_j^l$$

are samples, $\mathcal{A}$ represents active tasks and L represents the total number of layers;

training a weight hypernet, keeping the anchor net and the edge hypernet fixed; and generating, by the hypernetwork before inference time, an architectural configuration for a main model based on the task preference vector and the resource constraint.

9. The computer system for building a dynamic multi-task network of claim 8, wherein the N-stream anchor network has fixed weights for finding the tree sub-structures.

10. The computer system for building a dynamic multi-task network of claim 8, wherein finding the tree sub-structures includes selecting a parent from every node.

11. The computer system for building a dynamic multi-task network of claim 8, wherein the edge hypernet predicts the branching parameters within the anchor network.

12. The computer system for building a dynamic multi-task network of claim 8, further comprising optimizing a task loss, $L_{task}$, by taking into account the individual competing task performances without considering a computational cost.

13. The computer system for building a dynamic multi-task network of claim 8, wherein competing tasks with higher preferences have a greater influence.

14. The computer system for building a dynamic multi-task network of claim 8, wherein the active loss is additionally weighted by a cost preference, c, of the resource constraint tuple to enable the control of total computational cost.

15. A non-transitory computer program product for building a dynamic multi-task network, the computer program product comprising a non-transitory computer readable storage medium having program instructions embodied therewith, the program instructions executable by a computer to cause the computer to perform a method comprising:

generating a hypernetwork configured to model tradeoffs among a plurality of competing tasks;

receiving a task preference vector identifying a hierarchical priority for the plurality of competing tasks, and a resource constraint as a tuple;

finding tree sub-structures and the corresponding modulation of features for every tuple within an N-stream anchor network;

optimizing a branching regularized loss function to train an edge hypernet, wherein the branching regularized loss function is based on an active loss $L_{active}$ and an inactive loss, the active loss, $L_{active}$, is calculated as:

$$\mathcal{L}_{active} = \sum_{l=1}^{L} \sum_{\substack{i, j \in \mathcal{A} \\ i \neq j}} \frac{L-l}{L} \cdot A(i, j) \cdot P(l, i, j) \cdot \|v_i^l - v_j^l\|^2$$

where $P(l, i, j)=P_{use}(l, i)\cdot P_{use}(l,j)$ is the probability that the nodes i and j in layer l are used in the sampled tree structure, and A(i,j) captures the task affinity between tasks, $\tau_i$ and $\tau_j$, and $$v_i^l$$

and $$v_j^l$$

are samples, $\mathcal{A}$ represents active tasks and L represents the total number of layers;

calculating an active loss and an inactive loss to determine branching within the anchor network training a weight hypernet, keeping the anchor network and the edge hypernet fixed; and generating, by the hypernetwork before inference time, an architectural configuration for a main model based on the task preference vector and the resource constraint.

16. The computer program product as recited in claim 15, wherein the N-stream anchor network has fixed weights for finding the tree sub-structures.

17. The computer program product as recited in claim 15, wherein finding the tree sub-structures includes selecting a parent from every node.

18. The computer program product as recited in claim 15, wherein the edge hypernet predicts the branching parameters within the anchor network.

19. The computer program product as recited in claim 15, further comprising optimizing a task loss, $L_{task}$, by taking into account the individual competing task performances without considering a computational cost.

20. The computer program product as recited in claim 15, wherein competing tasks with higher preferences have a greater influence.

* * * * *